(No Model.)
C. A. JOSLYN.
Harvester.
No. 230,284.            Patented July 20, 1880.
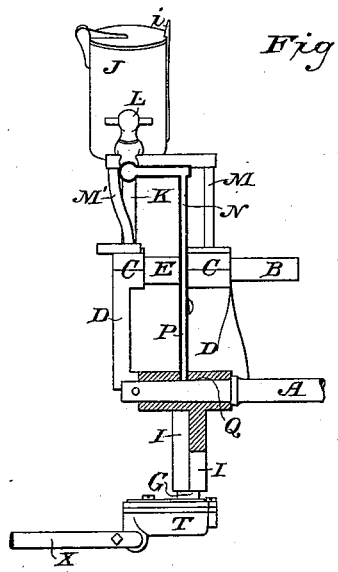
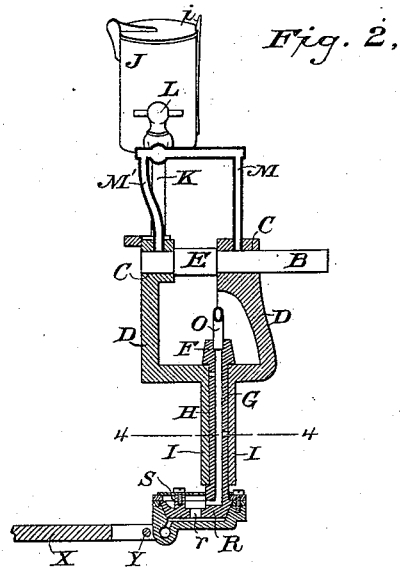
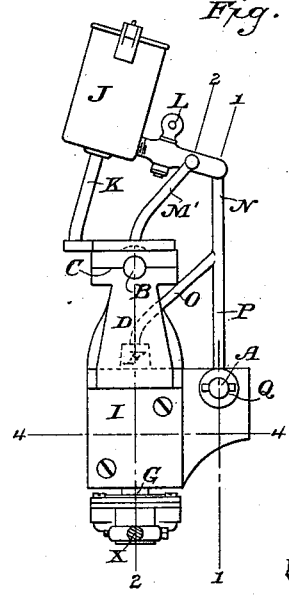
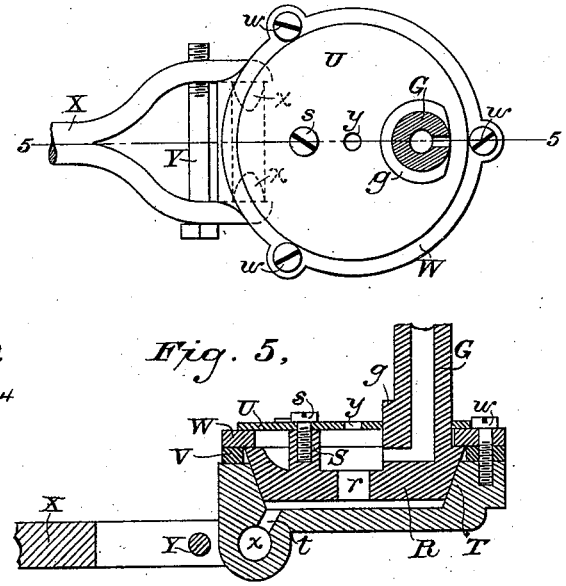
WITNESSES
Wm A. Shinkle
Geo. W. Breck
INVENTOR
Charles A. Joslyn.
By his Attorneys
Baldwin, Hopkins & Peyton.

UNITED STATES PATENT OFFICE.

CHARLES A. JOSLYN, OF ROCHESTER, MINNESOTA.

HARVESTER.

SPECIFICATION forming part of Letters Patent No. 230,284, dated July 20, 1880.

Application filed May 8, 1880. (No model.)

*To all whom it may concern:*

Be it known that I, CHARLES A. JOSLYN, of Rochester, in the county of Olmsted and State of Minnesota, have invented certain new and useful Improvements in Harvesters, of which the following is a specification.

My invention relates to improvements in apparatus for actuating the cutters and for lubricating the bearings of harvesters, and is shown as especially adapted for application to mowers built by D. S. Morgan & Co., of Brockport, New York, under and in accordance with sundry Letters Patent of the United States, particularly the patent granted March 28, 1876, No. 175,511, for the invention of Wm. H. Seymour, and to which patent reference is hereby made for such full understanding of parts which are not shown by the annexed drawings nor in detail described as may be needful to a complete comprehension of my improvements.

My improvements will first fully be described in connection with the accompanying drawings, preparatory to designating what is claimed.

Figure 1 is a view, partly in front elevation and partly in section, on the line 1 1 of Fig. 3; Fig. 2, a similar view, the section being on the line 2 2 of Fig. 3; Fig. 3, a side elevation with the pitman in section; Fig. 4, an enlarged view, partly in plan and partly in section, on the lines 4 4 of Figs. 2 and 3, with the gearing-frame plates or housing about the crank-shaft omitted; and Fig. 5, a vertical section on the line 5 5 of Fig. 4.

As shown and described in the Patent No. 175,511, the main axle A is supported loosely by suitable wheels, the inner one being dished and inclosing an internally-toothed ring or spur-gear fast on the axle independently of the wheel, so as to drive a spur-pinion on the counter-shaft B, turning in bearings C C above and in rear of the axle in the arms or plates D D of the forked gearing-support or supplementary frame outside the driving-wheel, and partially inclosed within its rim or flanged tread.

The counter-shaft carries a bevel-gear at E between the plates or forks D D of the gear-frame, and drives a bevel-pinion, F, on an upright crank-shaft, G, turning in a sleeve-bearing, H, in the downwardly-projecting portions I I of the frame-plates, which are screwed or bolted together about the crank-shaft, the bearing for which is formed half in each plate.

To the extent above described the construction and operation of parts are similar to or essentially the same as in the Patent No. 175,511 referred to.

To lubricate the various bearings I provide an oil-reservoir, J, with a suitable hinged lid and securing-catch, $i$. A strainer or perforated diaphragm in the reservoir near its top serves to filter the lubricant as poured into it.

A standard, K, detachably bolted to the top outer portion of the gearing-frame, supports the reservoir, and a tube issuing from the reservoir near its base is provided with a cock, L, and communicates with a system of oil-conducting tubes, M, M', N, O, and P.

When the cock is opened oil is admitted to the counter-shaft bearings C C by the pipes M M', and by the way of the pipes N and P and N and O oil passes to the bearing Q for the axle and to the crank-shaft G, which is tubular and provided with several perforations to allow oil to escape from it to its long or sleeve bearing.

The tube O projects a short distance into the crank-shaft, and a portion of the oil passes down through this shaft to pitman-actuating apparatus, constructed and operating as follows: The tubular crank-shaft G is formed with or rigidly connected to an eccentric, R, dished or hollowed out at top, and provided with an upwardly-projecting stud, S, and with a central opening, $r$, through its bottom. The oil-passage through the crank-shaft conducts the lubricant to the eccentric, and from thence it passes by the opening $r$ to the bottom of the socket or seat T, in which the eccentric turns. The periphery of the eccentric is conical, and a corresponding shape is given to the inner circumference or walls of the seat. The crank-shaft has a shoulder, $g$, on it, fitting in a hole in a sand-cap or disk-cover, U, for the eccentric. A screw, $s$, passes through this cap into a low stud or post, S, on the eccentric. In this way the cap is secured to the eccentric and crank-shaft and turns with them, protecting the hollowed-out eccentric from sand, trash, &c.

A securing or clamping ring, W, of metal, rests at its inner edge upon or partly overlaps the edge of the eccentric, and is secured to the eccentric-socket by several screws, w, which pass through one or more elastic packing washers or rings, V, upon the socket T and outside the eccentric. The sand-cap and metallic securing-ring always occupy the same relative positions, turning with the eccentric. The securing-ring and cap are drawn down snugly, but not too tightly, upon the eccentric edge.

The lubricant, which passes by way of the opening r, spreads to the contact-surfaces of the eccentric and its socket-bearing. Oil also flows by a channel, t, to a socket for the cone-studs x x of a split-ended or forked pitman, X, provided with a screw-bolt, Y, by which the yielding forks of the pitman are drawn into their seats and properly held in their bearings.

Wear is compensated by manipulating the screw-bolt Y, as will readily be understood.

The pitman connects with cutters in the usual way.

It will be seen that the conical eccentric can be adjusted in its inclined or correspondingly-shaped bearing or seat to compensate wear by compressing the ring washer or yielding packing, and that all the parts are thoroughly lubricated and protected.

A vent, y, for the escape of air prevents any obstruction to the flow of the lubricant. This opening y serves also as an inlet by which to supply oil directly to the eccentric when it is desirable to do so.

I am aware that lubricating-reservoirs have heretofore frequently been employed in various ways in connection with pipes leading to different bearings to be oiled, and do not broadly claim supplying a number of bearings from a single oil-supply by conducting-pipes. Neither do I claim, broadly, driving the cutters of a harvester by an eccentric and a socket or strap fitting around it, nor every way of lubricating cutter-driving mechanism of such type.

I claim as of my own invention—

1. The combination of the tubular crank-shaft, the dished eccentric with which the oil-passage through the crank-shaft communicates, the socket seat or bearing for the eccentric, the pitman, and the cone-stud bearings supplied with oil from the eccentric-bearing, substantially as and for the purpose hereinbefore set forth.

2. The combination of the crank-shaft, the dished or hollowed-out eccentric, its seat or socket, the sand cap or cover, the packing-ring, and the metallic securing-ring, substantially as and for the purpose hereinbefore set forth.

3. The combination, substantially as hereinbefore set forth, of the crank-shaft, the eccentric, the eccentric bearing or socket, the sand-cap having the vent therein, the securing-ring, and the packing, for the purpose described.

In testimony whereof I have hereunto subscribed my name.

CHAS. A. JOSLYN.

Witnesses:
 CHAS. C. WILLSON,
 DeFOREST BUCKLEN.